US011064390B2

(12) United States Patent
Chang et al.

(10) Patent No.: US 11,064,390 B2
(45) Date of Patent: Jul. 13, 2021

(54) TRAFFIC CONTROL METHOD AND DEVICE, TERMINAL, SYSTEM, AND STORAGE MEDIUM

(71) Applicant: ZTE CORPORATION, Guangdong (CN)

(72) Inventors: Wei Chang, Shenzhen (CN); Wenbin Yan, Shenzhen (CN); Xiong Tang, Shenzhen (CN); Cheng Chen, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 27 days.

(21) Appl. No.: 16/471,707

(22) PCT Filed: Dec. 13, 2017

(86) PCT No.: PCT/CN2017/115947
§ 371 (c)(1),
(2) Date: Jun. 20, 2019

(87) PCT Pub. No.: WO2018/113568
PCT Pub. Date: Jun. 28, 2018

(65) Prior Publication Data
US 2019/0335362 A1    Oct. 31, 2019

(30) Foreign Application Priority Data
Dec. 20, 2016    (CN) .......................... 201611188090.7

(51) Int. Cl.
*H04W 28/10* (2009.01)
*H04B 7/185* (2006.01)
(Continued)

(52) U.S. Cl.
CPC ........ *H04W 28/10* (2013.01); *H04B 7/18513* (2013.01); *H04B 7/18519* (2013.01);
(Continued)

(58) Field of Classification Search
None
See application file for complete search history.

(56) References Cited

U.S. PATENT DOCUMENTS

| 8,457,627 B2 | 6/2013 | Lauer |
| 9,439,214 B2 | 9/2016 | Alex et al. |

(Continued)

FOREIGN PATENT DOCUMENTS

| CN | 1741504 A | 3/2006 |
| CN | 101789904 A | 7/2010 |

(Continued)

OTHER PUBLICATIONS

Int. Search Report cited in Int. Application No. PCT/CN2017/115947 dated Feb. 24, 2018, 4 pgs.

(Continued)

*Primary Examiner* — Christine T Duong
(74) *Attorney, Agent, or Firm* — Cooper Legal Group, LLC

(57) ABSTRACT

Disclosed is a traffic control method applied to a satellite network, comprising: after accessing a wireless local area network, a terminal determines the type of the accessed wireless local area network; send a networking data packet of an application to a network element when it is determined that the wireless local area network is a wireless local area network of a satellite network; the network element determines whether to control traffic of the application according to the networking data packet and preset rules. Also disclosed are a system, a terminal, a traffic control device applied to a satellite network, and a storage medium.

17 Claims, 10 Drawing Sheets

(51) Int. Cl.
  *H04L 12/741* (2013.01)
  *H04L 12/801* (2013.01)
  *H04L 12/815* (2013.01)
  *H04W 84/06* (2009.01)

(52) U.S. Cl.
  CPC ............ *H04L 45/54* (2013.01); *H04L 47/115* (2013.01); *H04L 47/22* (2013.01); *H04W 84/06* (2013.01)

(56) References Cited

U.S. PATENT DOCUMENTS

| | | | |
|---|---|---|---|
| 2005/0136930 A1* | 6/2005 | Dent | H04B 7/18563 455/445 |
| 2012/0213210 A1 | 8/2012 | Thomasson et al. | |
| 2014/0282999 A1* | 9/2014 | Iwanski | H04L 63/02 726/12 |
| 2015/0036492 A1* | 2/2015 | Jin | H04W 76/18 370/230 |
| 2016/0308818 A1* | 10/2016 | Torres | H04L 45/741 |

FOREIGN PATENT DOCUMENTS

| | | |
|---|---|---|
| CN | 102594814 A | 7/2012 |
| CN | 103384967 A | 11/2013 |
| CN | 103746928 A | 4/2014 |
| CN | 103796248 A | 5/2014 |
| CN | 105991460 A | 10/2016 |
| CN | 105991469 A | 10/2016 |
| CN | 106059650 A | 10/2016 |

OTHER PUBLICATIONS

Written Opinion cited in Int. Application No. PCT/CN2017/115947 dated Feb. 24, 2018, 8 pgs.
First Chinese Office Action cited in Application No. 201611188090.7 dated Apr. 26, 2020, 20 pgs.
First Search Report cited in Application No. 2016111880907 dated Apr. 16, 2020, 3 pgs.

* cited by examiner

TRAFFIC CONTROL METHOD AND DEVICE, TERMINAL, SYSTEM, AND STORAGE MEDIUM

CROSS-REFERENCE TO RELATED APPLICATIONS

The present application is based upon and claims benefit to the Chinese Patent Application No. 201611188090.7, filed on Dec. 20, 2016, the contents of which are hereby incorporated by reference in its entirety.

TECHNICAL FIELD

The disclosure relates to the technical field of satellite communications, and in particular to a method and a device for controlling traffic, a terminal, a system and a storage medium.

BACKGROUND

Since a signal in the cellular mobile communication system cannot cover a range of all onshore and offshore areas, a satellite communication system, as an effective supplementary manner, is widely applied to a variety of fields such as ocean transportation, exploratory boring, reconnaissance survey and fishery in a range where the signal in the cellular mobile communication system cannot cover. The satellite communication system has many advantages of not being limited by factors such as time, a place and an environment, a short turn-on time, a far transmission distance, fast network deployment, irrelevance of communication cost with a communication distance, and implementation of real-time bidirectional transmission between a voice and data.

A transmission scenario of the satellite communication system is as shown in FIG. 1. A user accesses a terminal device via a wireless-fidelity (WIFI), and then the terminal device converts accessed data into satellite transmission data, and sends the satellite transmission data to a ground station for communication. The terminal device is a GateWay (GW).

At present, the satellite communication system has a high price of traffic due to a low bandwidth and high renting expense. When a terminal user detects that a current network is in a WIFI connected state, the terminal will carry out a lot of operations such as data update, downloading or uploading in the background, which occupy a great number of bandwidths of the satellite. Therefore, it is important to control the traffic used by the operations of the terminal in the background.

There are two solutions for controlling traffic in the conventional art for a terminal installed with the Android system. In the first solution, a mobile manager acquires an authority of a terminal system via ROOT, and directly limits a networking authority of an application. However, with the update of a version of the Android system, it is increasingly difficult to acquire the authority of the system via the ROOT. In the second solution, a virtual private network (VPN) is provided using Google. Specifically, after a VPN is started by a terminal installed with the Android system, networking data of all applications in the terminal is transmitted via a VPN channel. It is determined based on the VPN channel whether an application (APP) corresponding to a networking request is in the background at present, to limit an action of the APP in the background. Currently, some traffic guard software used by the terminal is also based on the above solution. However, as the traffic guard is provided in a VPN server on the internet, and the data of the terminal are transmitted to the VPN server on the internet via the VPN channel, the overhead of a header of an internet protocol (IP) for satellite transmission is increased, which is unacceptable to the satellite network. On the other hand, the Google no longer determines whether an APP is in the foreground or the background in a version above Android 5.0, and thus it is unable to control the traffic based on a foreground or background action of the APP.

SUMMARY

In view of this, a method and a device for controlling traffic applied to a satellite network, a terminal, a system and a storage medium are provided according to the embodiments of the disclosure, to control WIFI traffic of a user in a satellite network, and save the operation cost of the satellite network.

The technical solutions in the embodiments of the disclosure are implemented as follows.

A method for controlling traffic is provided according to an embodiment of the disclosure, which is applied to a satellite network and include the following steps.

A network element receives a networking data message, sent by a terminal, of an application, and determines, based on the networking data message and a preset rule, whether to control traffic of the application.

Another method for controlling traffic is further provided according to an embodiment of the disclosure, which may include the following steps. After accessing a wireless-fidelity, a terminal determines an access type of the wireless-fidelity.

In responsive to that it is determined that the wireless-fidelity is a wireless-fidelity of a satellite network, a networking data message of an application is sent to a network element, The networking data message of the application is used by the network element to determine whether to control traffic of the application.

A device for controlling traffic is further provided according to an embodiment of the disclosure, which is applied to a satellite network and includes: a receiving module and a first processing module.

The receiving module is configured to receive a networking data message of an application.

The first processing module is configured to determine, based on the networking data message and a preset rule, whether to control traffic of the application.

A terminal is further provided according to an embodiment of the disclosure, which includes a determining module and a sending module.

The determining module is configured to determine, after the terminal accesses a wireless-fidelity, an access type of the wireless-fidelity.

The sending module is configured to send a networking data message of an application to a network element in responsive to that it is determined that the wireless-fidelity is a wireless-fidelity of a satellite network. The networking data message of the application is used by the network element to determine whether to control traffic of the application.

A system for controlling traffic is further provided according to an embodiment of the disclosure, which includes a terminal and a network element.

The terminal is configured to determine, after accessing a wireless-fidelity, an access type of the wireless-fidelity, and send a networking data message of an application to a network element in responsive to that it is determined that the wireless-fidelity is a wireless-fidelity of a satellite network.

The network element is configured to receive the networking data message of the application sent by the terminal, and determine, based on the networking data message and a preset rule, whether to control traffic of the application.

A terminal is further provided according to an embodiment of the disclosure, which includes a processor and a memory storing a processor executable instruction. The processor, when executing the instruction, performs the following actions.

After accessing a wireless-fidelity, a terminal determines an access type of the wireless-fidelity.

In responsive to that it is determined that the wireless-fidelity is a wireless-fidelity of a satellite network, a networking data message of an application is sent to a network element. The networking data message of the application is used by the network element to determine whether to control traffic of the application.

A device for controlling traffic is further provided according to an embodiment of the disclosure, which includes a processor and a memory storing a processor executable instruction. The processor, when executing the instruction, performs the following actions.

A networking data message of an application is received.

Whether to control traffic of the application is determined based on a networking parameter and a preset rule.

A storage medium is further provided according to an embodiment of the disclosure, which stores a computer executable instruction. The computer executable instruction is used for performing the following operations.

A networking data message, sent by a terminal, of an application is received.

Whether to control traffic of the application is determined based on the networking data message and a preset rule.

Another storage medium is further provided according to an embodiment of the disclosure, which stores a computer executable instruction. The computer executable instruction is used for performing the following operations.

After a wireless-fidelity is accessed, an access type of the wireless-fidelity is determined.

In responsive to that it is determined that the wireless-fidelity is a wireless-fidelity of a satellite network, a networking data message of an application is sent to a network element. The networking data message of the application is used by the network element to determine whether to control traffic of the application.

With the method and the device for controlling traffic applied into the satellite network, the terminal, the system and the storage medium provided by the embodiments of the disclosure, after accessing the wireless-fidelity, the terminal determines an access type of the wireless-fidelity, and in responsive to that it is determined that the wireless-fidelity is the wireless-fidelity of the satellite network, a networking data message of the application is sent to a network element, and the network element determines whether to control the traffic of the application based on the networking data message and a preset rule. Therefore, the network element can determine whether to control the traffic of the application based on the networking data message of the application and the preset rule, thereby implementing the control for WIFI traffic of the user in the satellite network and saving operation cost of the satellite network.

DETAILED DESCRIPTION

The embodiments of the disclosure will be further described below in detail in combination with the accompanying drawings.

First Method Embodiment

Figure 1:
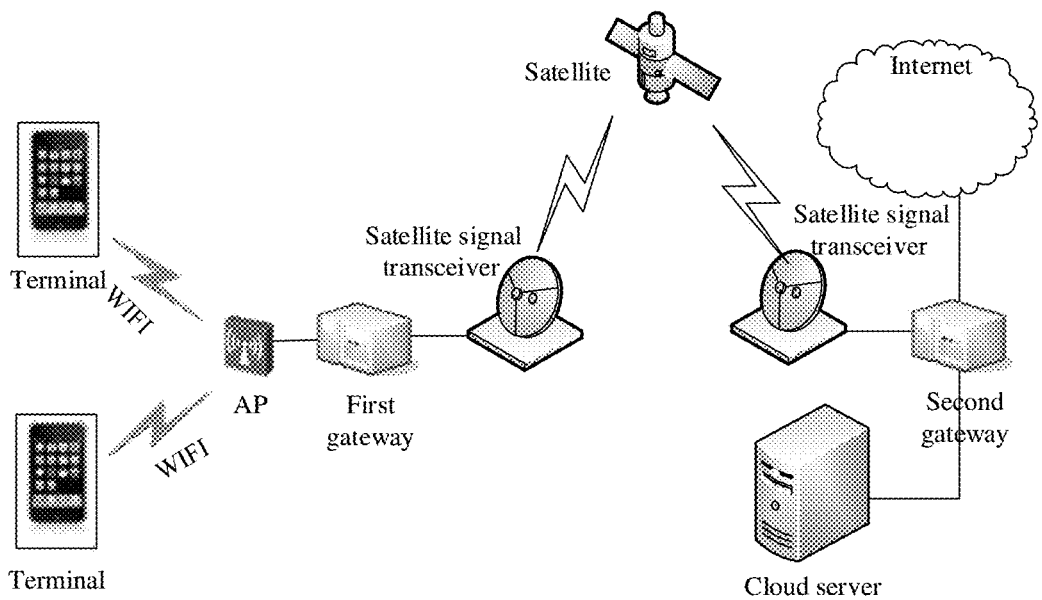
FIG. 1 is a schematic diagram showing a transmission scenario of a satellite communication system according to the disclosure.
Figure 2:
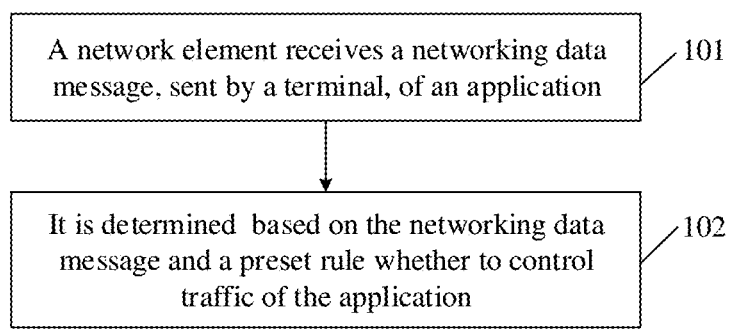
FIG. 2 is a schematic diagram showing a basic processing flow of a method for controlling traffic according to a first embodiment of the disclosure.

A basic processing flow of a method for controlling traffic applied to a satellite network according to the first embodiment of the disclosure is as shown in FIG. 2 and includes the following steps.

At Step 101, a network element receives a networking data message, sent by a terminal, of an application.

In one embodiment, the functions executed by the network element may be implemented by a gateway, and the gateway receives the networking data message, sent by the terminal, of the application.

At Step 102, whether to control traffic of the application is determined based on the networking data message and a preset rule.

In one embodiment, the functions executed by the network element may be implemented by a gateway. Upon the reception of the networking data message, the gateway parses the networking data message to obtain a networking parameter of the application. The networking parameter includes a target internet protocol (IP) address and a target port, or a domain name, or uniform resource locator (URL) information corresponding to the application.

The gateway searches a stored traffic control table based on the target IP address and the target port obtained by parsing corresponding to the application, and determines whether to control the traffic of the application. Alternatively, the gateway searches a stored traffic control table according to the domain name, and determines whether to control the traffic of the application. Alternatively, the gateway searches a stored traffic control table according to the URL information, and determines whether to control the traffic of the application.

The stored traffic control table may be preconfigured in the gateway, and may also be obtained by the gateway from the cloud server. Therefore, there are two solutions that the gateway determines whether to control the traffic of the application. In a first solution, the gateway determines whether to control the traffic of the application according to a traffic control table stored in the gateway. The gateway performs matching in the traffic control table stored in the gateway using a keyword of the application, does not control the traffic of the application if no traffic control solution corresponding to the application is contained in the traffic control table stored in the gateway, and controls, if a traffic control solution corresponding to the application is contained in the traffic control table stored in the gateway, the traffic according to the traffic control solution. In a second solution, the gateway first queries whether a traffic control solution corresponding to the application is contained in a traffic control table stored in the gateway, acquires, if no traffic control solution corresponding to the application is contained in the traffic control table stored in the gateway, a traffic control solution corresponding to the application from the cloud server, stores the acquired traffic control solution in the traffic control table, and controls the traffic of the application according to the stored traffic control table.

In responsive to that whether to control the traffic of the application is determined based on the target port and the target IP address, the traffic control table includes information such as a target IP address, a target port, a service name of the application and a version number of the application corresponding to a case that the application of the terminal transmits data. In responsive to that it is determined by searching the traffic control table to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In responsive to that whether to control the traffic of the application is determined based on the domain name or based on the URL information, a keyword corresponding to the domain name or the URL information is stored in the traffic control table. The domain name or the URL information is matched with a keyword stored in the traffic control table. If the matched keyword can be found, the networking data message corresponding to the application is prohibited from being transmitted, i.e., the traffic of the application is controlled. If no matched keyword can be found, the networking data message corresponding to the application is allowed to be transmitted, i.e., the traffic of the application is not controlled.

In this embodiment of the disclosure, the terminal may be a mobile terminal such as a mobile phone and a tablet computer, and may also be a terminal such as a desktop computer and a laptop computer. The application is any application installed on the terminal.

Second Method Embodiment

Figure 3:
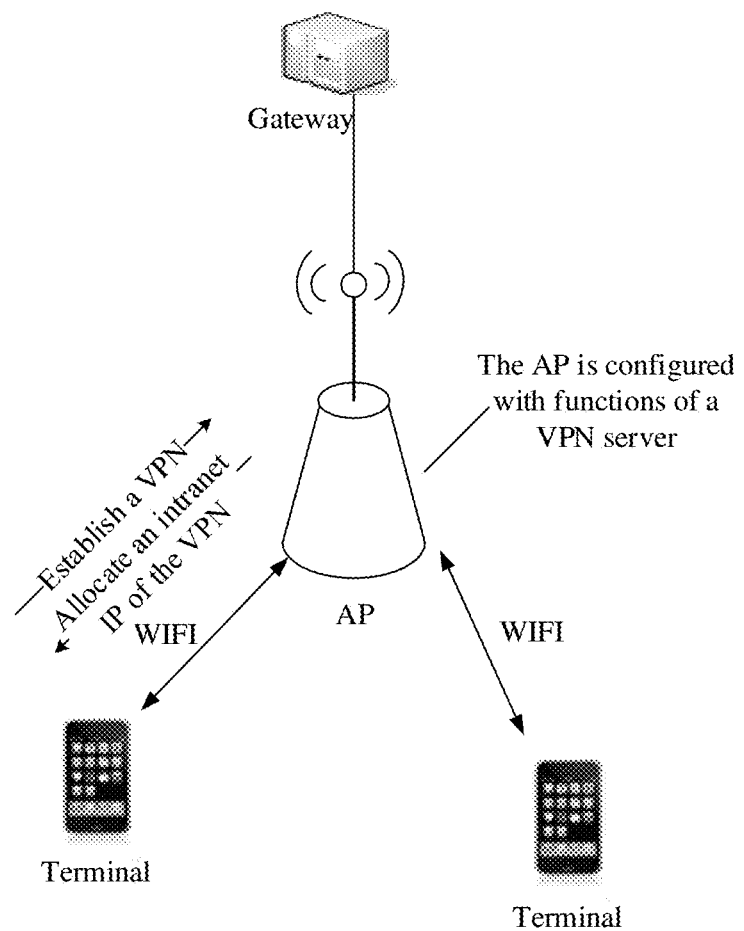
FIG. 3 is a schematic diagram showing a transmission scenario of a satellite communication system according to a second embodiment of the disclosure.
Figure 4:
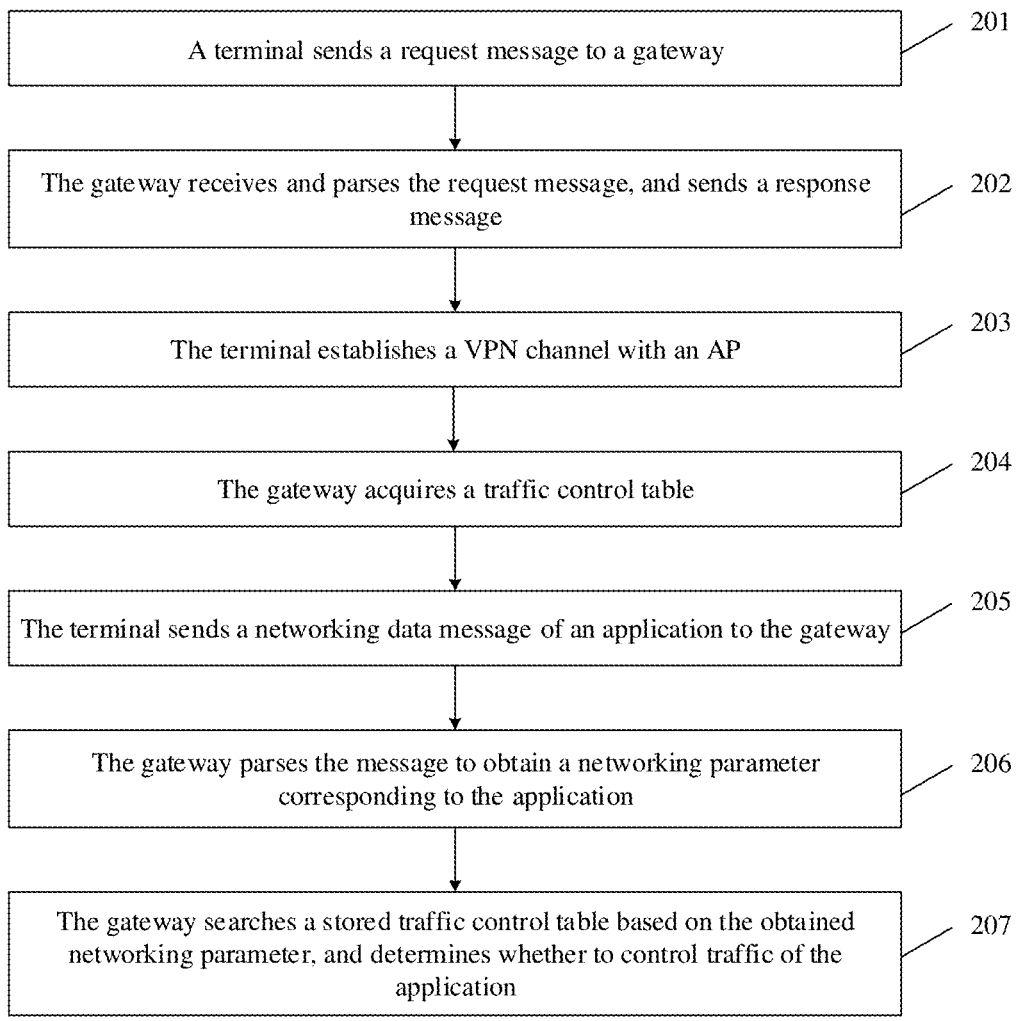
FIG. 4 is a schematic diagram showing a detailed processing flow of a method for controlling traffic according to a second embodiment of the disclosure.

In responsive to that a VPN server is provided in a wireless access point (AP), a transmission scenario of the satellite communication system is as shown in FIG. 3. A detailed processing flow of a method for controlling traffic applied to a satellite network according to the second embodiment of the disclosure is as shown in FIG. 4, and includes the following steps.

At Step 201, a terminal sends a request message to a gateway

In one embodiment, the terminal sends a request message to the gateway so as to determine an access environment of the terminal.

Figure 5:
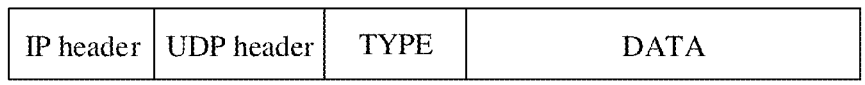
FIG. 5 is a schematic diagram showing a format of a request/response message according to an embodiment of the disclosure.
Figure 5:
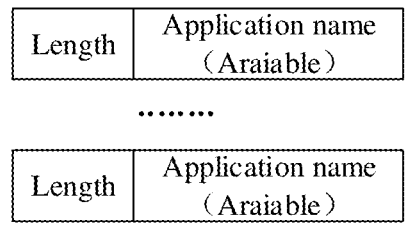

Herein, the format of the request message is as shown in FIG. 5. The TYPE in the message is represented as 01, which is used for indicating that the message is a message for requesting accessing the WIFI of the satellite network; and the DATA in the message indicates a type and a version number of a current operating system of the terminal.

At Step 202, the gateway receives and parses the request message, and sends a response message.

In one embodiment, the gateway receives the request message, parses the request message, acquires a type and a version number of the operating system of the terminal, and sends the response message.

The networking parameter includes a target IP address and a target port, or a domain name, or URL information corresponding to the application.

Herein, the format of the response message is as shown in FIG. 5. The TYPE is represented as 02, which is used for indicating that the message is a message for allowing the terminal to access the WIFI of the satellite network; and the DATA in the message is void.

At Step 203, the terminal establishes a VPN channel with an AP.

In one embodiment, upon the reception of the response message, the terminal determines that the current environment is the WIFI of the satellite network, and requests establishing the VPN channel with the AP by using an OPENVPN protocol. The terminal reads an APP list thereof, and sends the APP list to the gateway as a message. The format of the message is as shown in FIG. 5, the TYPE is represented as 03 and the DATA indicates an APP name and a length of the APP name.

In this embodiment of the disclosure, a networking authority of the APP is limited in a VPN manner. If the terminal does not receive the response message of the gateway, it is determined that the current environment is not the WIFI environment of the satellite network, and the process is ended. If the response message of the gateway is received by the terminal, the Step 204 is executed.

At Step 204, the gateway acquires a traffic control table.

In one embodiment, the gateway determines whether a traffic control solution corresponding to an APP in the APP list sent by the terminal is contained in a stored traffic control table. If no traffic control solution corresponding to an APP in the APP list sent by the terminal is contained in the stored traffic control table, the gateway sends a message for requesting acquiring the traffic control solution corresponding to the APP to a cloud server. The format of the request message is as shown in FIG. 5. Upon the reception of the request message, the cloud server sends the traffic control solution corresponding to the APP to the gateway. Upon the reception of the traffic control solution corresponding to the APP, the gateway stores the traffic control solution into the stored traffic control table.

At Step 205, the terminal sends a networking data message of an application to the gateway.

At Step 206, the gateway parses the message to obtain a networking parameter of the application.

In one embodiment, the networking parameter includes a target IP address and a target port, or a domain name, or URL information corresponding to the application.

At Step 207, the gateway searches the stored traffic control table based on the obtained networking parameter, and determines whether to control traffic of the application.

In one embodiment, the gateway searches the stored traffic control table based on the target IP address and the target port obtained by parsing corresponding to the application, and determines whether to control the traffic of the application. Alternatively, the gateway searches the stored traffic control table according to the domain name, and determines whether to control the traffic of the application. Alternatively, the gateway searches the stored traffic control table according to the URL information, and determines whether to control the traffic of the application.

The stored traffic control table may be preconfigured in the gateway, and may also be obtained by the gateway from the cloud server.

In responsive to that whether to control the traffic of the application is determined based on the target port and the target IP address, the traffic control table includes information such as a target IP address, a target port, a service name of the application and a version number of the application corresponding to a case that the application of the terminal transmits data. In responsive to that it is determined by searching the traffic control table to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In responsive to that whether to control the traffic of the application is determined based on the domain name or based on the URL information, a keyword corresponding to the domain name or the URL information is stored in the traffic control table. The domain name or the URL information is matched with a keyword stored in the traffic control table. If the matched keyword can be found, the networking data message corresponding to the application is prohibited from being transmitted, i.e., the traffic of the application is controlled. If no matched keyword can be found, the networking data message corresponding to the application is allowed to be transmitted, i.e., the traffic of the application is not controlled.

It is to be noted that the function executed by the terminal in this embodiment may be implemented by a client installed on the terminal.

Third Method Embodiment

Figure 6:
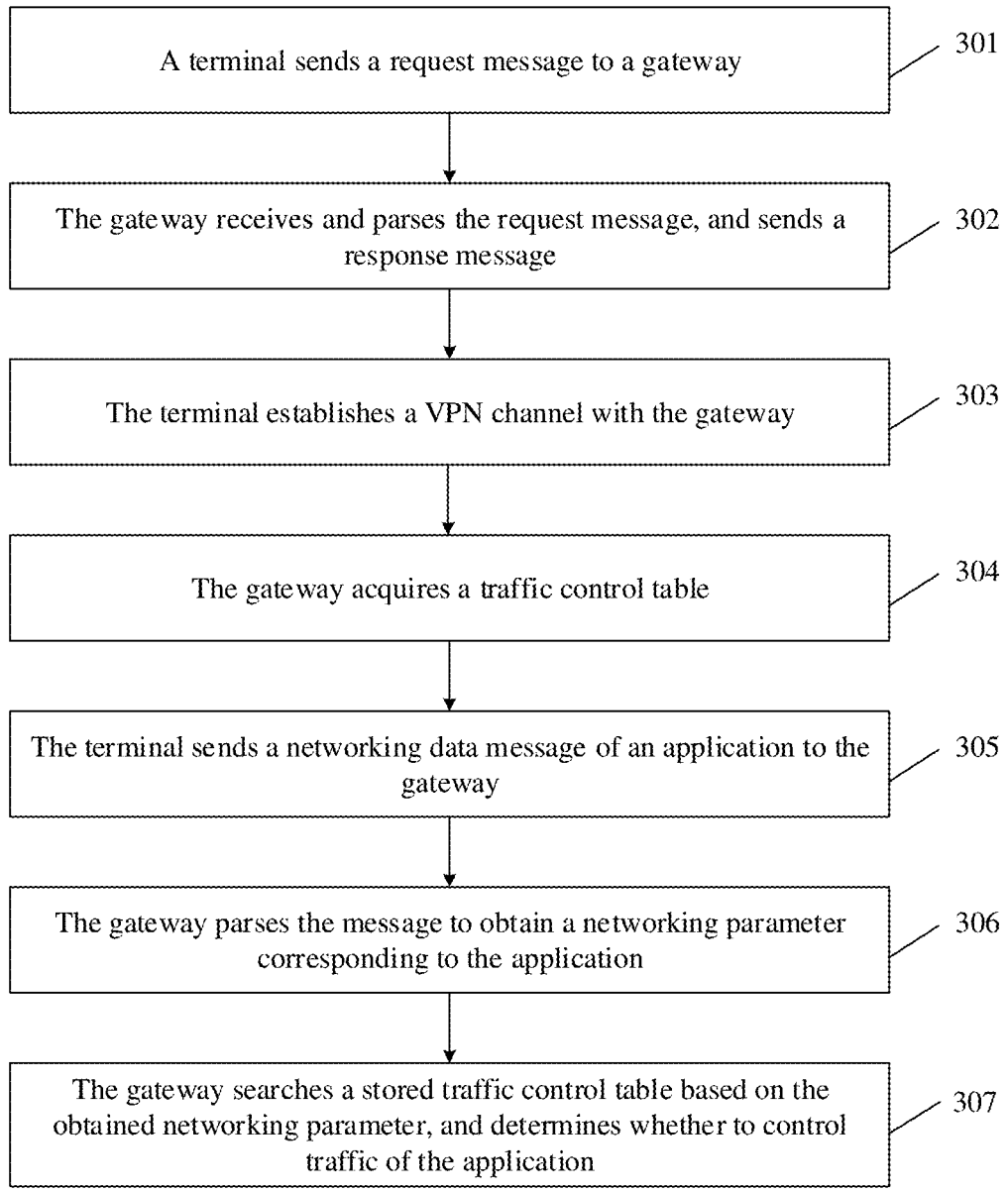
FIG. 6 is a schematic diagram showing a detailed processing flow of a method for controlling traffic according to a third embodiment of the disclosure.

If a VPN server is provided in a gateway, a detailed processing flow of a method for controlling traffic applied to a satellite network according to the third embodiment of the disclosure is as shown in FIG. 6 and includes the following steps.

At Step 301, a terminal sends a request message to a gateway.

In one embodiment, the terminal sends a request message to the gateway so as to determine an access environment of the terminal.

Herein, the format of the request message is as shown in FIG. 5. The TYPE in the message is represented as 01, which is used for indicating that the message is a message for requesting accessing the WIFI of the satellite network; and the DATA in the message indicates a type and a version number of a current operating system of the terminal.

At Step 302, the gateway receives and parses the request message, and sends a response message.

In one embodiment, the gateway receives the request message, parses the request message, acquires a type and a version number of the operating system of the terminal, and sends the response message.

Herein, the format of the response message is as shown in FIG. 5. The TYPE is represented as 02, which is used for indicating that the message is a message for allowing the terminal to access the WIFI of the satellite network; and the DATA in the message is void.

At Step 303, the terminal establishes a VPN channel with the gateway, and sends an APP list thereof to the gateway.

In one embodiment, upon the reception of the response message, the terminal determines that the current environment is the WIFI of the satellite network, and requests establishing the VPN channel with the gateway by using an OPENVPN protocol. The terminal reads an APP list thereof, and sends the APP list to the gateway as a message. The format of the message is as shown in FIG. 5, the TYPE is represented as 03 and the DATA indicates an APP name and a length of the APP name.

In this embodiment of the disclosure, a networking authority of the APP is limited in a VPN manner. If the terminal does not receive the response message of the gateway, it is determined that the current environment is not the WIFI environment of the satellite network, and the process is ended. If the response message of the gateway is received by the terminal, the Step 304 is executed.

The gateway determines whether a traffic control solution corresponding to an APP in the APP list sent by the terminal is contained in the stored traffic control table. If no traffic control solution corresponding to an APP in the APP list sent by the terminal is contained in the stored traffic control table, the gateway sends a message for requesting acquiring the traffic control solution corresponding to the APP to a cloud server. The format of the request message is as shown in FIG. 5. Upon the reception of the request message, the cloud server sends the traffic control solution corresponding to the APP to the gateway. Upon the reception of the traffic control solution corresponding to the APP, the gateway stores the traffic control solution into the stored traffic control table.

The traffic control table includes information such as a target IP address, a target port, a service name of the application and a version number of the application corresponding to a case that the application of the terminal transmits data.

At Step 304, the gateway acquires a traffic control table.

In one embodiment, the gateway determines whether a traffic control solution corresponding to an APP in the APP list sent by the terminal is contained in the stored traffic control table. If no traffic control solution corresponding to an APP in the APP list sent by the terminal is contained in the stored traffic control table, the gateway sends a message for requesting acquiring the traffic control solution corresponding to the APP to a cloud server. The format of the request message is as shown in FIG. 5. Upon the reception of the request message, the cloud server sends the traffic control solution corresponding to the APP to the gateway. Upon the reception of the traffic control solution corresponding to the APP, the gateway stores the traffic control solution into the stored traffic control table.

At Step 305, the terminal sends a networking data message of an application to the gateway.

At Step 306, the gateway parses the message to obtain a networking parameter of the application.

In one embodiment, the networking parameter includes a target IP address and a target port, or a domain name, or URL information corresponding to the application.

At Step 307, the gateway searches the stored traffic control table based on the obtained networking parameter, and determines whether to control traffic of the application.

In one embodiment, the gateway searches the stored traffic control table based on the target IP address and the target port obtained by parsing corresponding to the application, and determines whether to control the traffic of the application. Alternatively, the gateway searches the stored traffic control table according to the domain name, and determines whether to control the traffic of the application. Alternatively, the gateway searches the stored traffic control table according to the URL information, and determines whether to control the traffic of the application.

The stored traffic control table may be preconfigured in the gateway, and may also be obtained by the gateway from the cloud server.

In responsive to that whether to control the traffic of the application is determined based on the target port and the target IP address, the traffic control table includes information such as a target IP address, a target port, a service name of the application and a version number of the application corresponding to a case that the application of the terminal transmits data. In responsive to that it is determined by searching the traffic control table to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In responsive to that whether to control the traffic of the application is determined based on the domain name or based on the URL information, a keyword corresponding to the domain name or the URL information is stored in the traffic control table. The domain name or the URL information is matched with a keyword stored in the traffic control table. If the matched keyword can be found, the networking data message corresponding to the application is prohibited from being transmitted, i.e., the traffic of the application is controlled. If no matched keyword can be found, the networking data message corresponding to the application is allowed to be transmitted, i.e., the traffic of the application is not controlled.

It is to be noted that the function executed by the terminal in this embodiment may be implemented by a client installed on the terminal.

Fourth Method Embodiment

Figure 7:
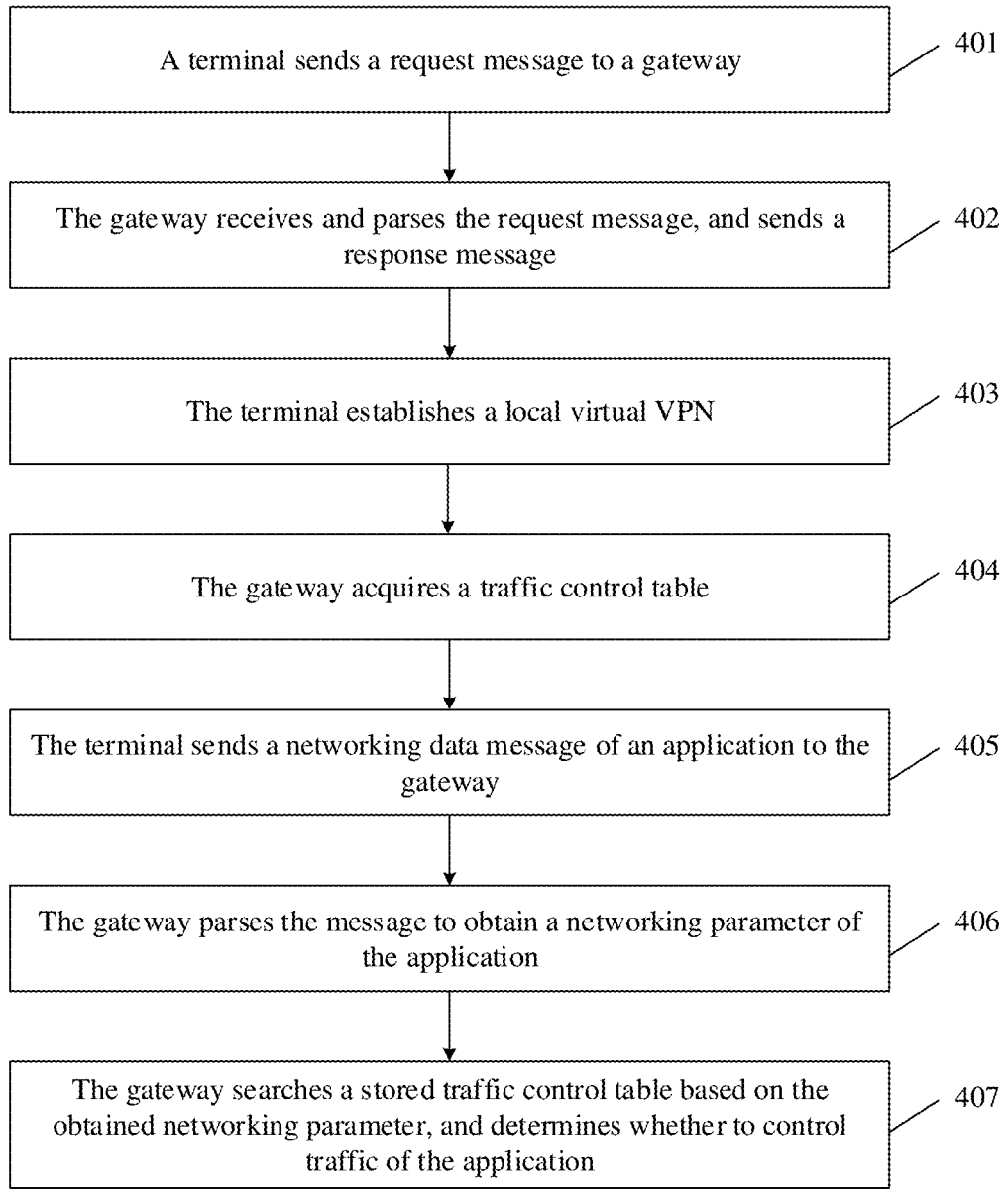
FIG. 7 is a schematic diagram showing a detailed processing flow of a method for controlling traffic according to a fourth embodiment of the disclosure.

If the terminal is both a VPN client and a VPN server, a detailed processing flow of a method for controlling traffic applied to a satellite network according to the fourth embodiment of the disclosure is as shown in FIG. 7 and includes the following steps.

At Step 401, a terminal sends a request message to a gateway.

In one embodiment, the terminal sends the request message to the gateway so as to determine an access environment of the terminal.

Herein, the format of the request message is as shown in FIG. 5. The TYPE in the message is represented as 01, which is used for indicating that the message is a message for requesting accessing the WIFI of the satellite network; and the DATA in the message indicates a type and a version number of a current operating system of the terminal.

At Step 402, the gateway receives and parses the request message, and sends a response message.

In one embodiment, the gateway receives the request message, parses the request message, acquires a type and a version number of the operating system of the terminal, and sends the response message.

Herein, the format of the response message is as shown in FIG. 5. The TYPE is represented as 02, which is used for indicating that the message is a message for allowing the terminal to access the WIFI of the satellite network; and the DATA in the message is void.

At Step 403, the terminal establishes a local virtual VPN.

In one embodiment, upon the reception of the response message, the terminal determines that the current environment is the WIFI of the satellite network, and establishes a local virtual VPN channel After the local virtual VPN channel is established, the terminal reads an APP list thereof, and sends the APP list to the gateway as a message. The format of the message is as shown in FIG. 5, the TYPE is represented as 03 and the DATA indicates an APP name and a length of the APP name.

In this embodiment of the disclosure, a networking authority of the APP is limited in a VPN manner. If the terminal does not receive the response message of the gateway, it is determined that the current environment is not the WIFI environment of the satellite network, and the process is ended. If the response message of the gateway is received by the terminal, the Step 404 is executed.

At Step 404, the gateway acquires a traffic control table.

In one embodiment, the gateway determines whether a traffic control solution corresponding to any APP in the APP list sent by the terminal is contained in the stored traffic control table. If no traffic control solution corresponding to any APP in the APP list sent by the terminal is contained in the stored traffic control table, the gateway sends a message for requesting acquiring the traffic control solution corresponding to the APP to a cloud server. The format of the request message is as shown in FIG. 5. Upon the reception of the request message, the cloud server sends the traffic control solution corresponding to the APP to the gateway. Upon the reception of the traffic control solution corresponding to the APP, the gateway stores the traffic control solution into the stored traffic control table.

In one embodiment, the gateway determines whether a traffic control solution corresponding to any APP in the APP list sent by the terminal is contained in the stored traffic control table. If no traffic control solution corresponding to any APP in the APP list sent by the terminal is contained in the stored traffic control table, the gateway sends a message for requesting acquiring the traffic control solution corresponding to the APP to a cloud server. The format of the request message is as shown in FIG. 5. Upon the reception of the request message, the cloud server sends the traffic control solution corresponding to the APP to the gateway. Upon the reception of the traffic control solution corresponding to the APP, the gateway stores the traffic control solution into the stored traffic control table.

The traffic control table includes information such as a target IP address, a target port, a service name of the application and a version number of the application corresponding to a case that the application of the terminal transmits data.

At Step 405, the terminal sends a networking data message of an application to the gateway.

At Step 406, the gateway parses the message to obtain a networking parameter of the application.

In one embodiment, the networking parameter includes a target IP address and a target port, or a domain name, or URL information corresponding to the application.

At Step 407, the gateway searches the stored traffic control table based on the obtained networking parameter, and determines whether to control traffic of the application.

In one embodiment, the gateway searches the stored traffic control table based on the target IP address and the target port obtained by parsing corresponding to the application, and determines whether to control the traffic of the application. Alternatively, the gateway searches the stored traffic control table according to the domain name, and determines whether to control the traffic of the application. Alternatively, the gateway searches the stored traffic control table according to the URL information, and determines whether to control the traffic of the application.

The stored traffic control table may be preconfigured in the gateway, and may also be obtained by the gateway from the cloud server.

In responsive to that whether to control the traffic of the application is determined based on the target port and the target IP address, the traffic control table includes information such as a target IP address, a target port, a service name of the application and a version number of the application corresponding to a case that the application of the terminal transmits data. In responsive to that it is determined by searching the traffic control table to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In responsive to that whether to control the traffic of the application is determined based on the domain name or based on the URL information, a keyword corresponding to the domain name or the URL information is stored in the traffic control table. The domain name or the URL information is matched with a keyword stored in the traffic control table. If the matched keyword can be found, the networking data message corresponding to the application is prohibited from being transmitted, i.e., the traffic of the application is controlled. If no matched keyword can be found, the networking data message corresponding to the application is allowed to be transmitted, i.e., the traffic of the application is not controlled.

It is to be noted that the function executed by the terminal in this embodiment may be implemented by a client installed on the terminal.

Fifth Method Embodiment

Figure 8:
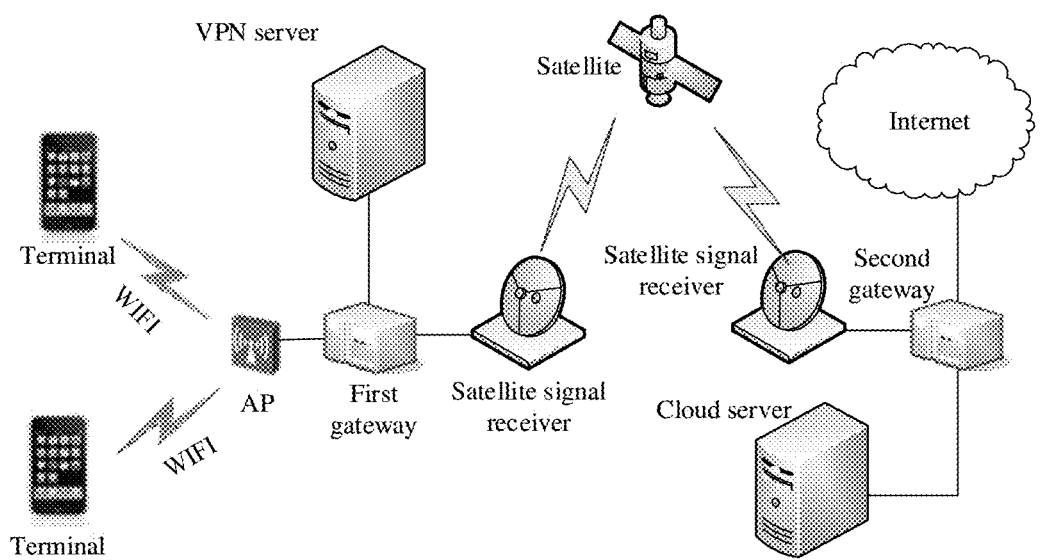
FIG. 8 is a schematic diagram showing a transmission scenario of a satellite communication system according to a fifth embodiment of the disclosure.
Figure 9:
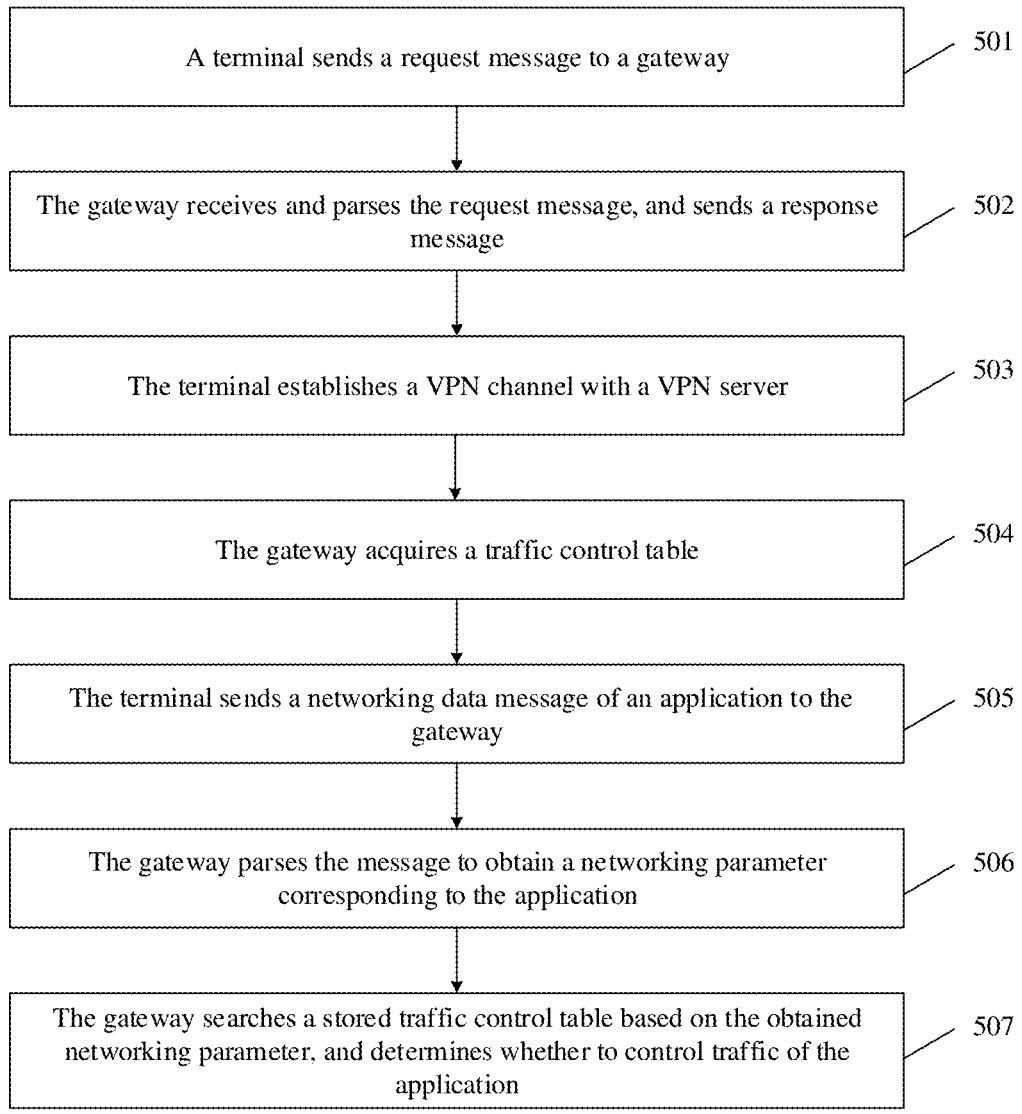
FIG. 9 is a schematic diagram showing a detailed processing flow of a method for controlling traffic according to a fifth embodiment of the disclosure.

When a network element of a VPN server is added at a gateway side, a transmission scenario of the satellite communication system is as shown in FIG. 8. A detailed processing flow of a method for controlling traffic applied to a satellite network according to the fifth embodiment of the disclosure is as shown in FIG. 9, and includes the following steps.

At Step 501, a terminal sends a request message to a gateway.

In one embodiment, the terminal sends the request message to the gateway so as to determine an access environment of the terminal.

Herein, the format of the request message is as shown in FIG. 5. The TYPE in the message is represented as 01, which is used for indicating that the message is a message for requesting accessing the WIFI of the satellite network; and the DATA in the message indicates a type and a version number of a current operating system of the terminal.

At Step 502, the gateway receives and parses the request message, and sends a response message.

In one embodiment, the gateway receives the request message, parses the request message, acquires a type and a version number of the operating system of the terminal, and sends the response message.

Herein, the format of the response message is as shown in FIG. 5. The TYPE is represented as 02, which is used for indicating that the message is a message for allowing the terminal to access the WIFI of the satellite network; and the DATA in the message is void.

At Step 503, the terminal establishes a VPN channel with a VPN server.

In one embodiment, upon the reception of the response message, the terminal determines that the current environment is the WIFI of the satellite network, and requests establishing the VPN channel with the gateway by using an OPENVPN protocol. The terminal reads an APP list thereof, and sends the APP list to the VPM server as a message. The format of the message is as shown in FIG. 5, the TYPE is represented as 03 and the DATA indicates an APP name and a length of the APP name.

In this embodiment of the disclosure, a networking authority of the APP is limited in a VPN manner. If the terminal does not receive the response message of the gateway, it is determined that the current environment is not the WIFI environment of the satellite network, and the process is ended. If the response message of the gateway is received by the terminal, the Step 604 is executed.

At Step 504, the gateway acquires a traffic control table.

In one embodiment, the gateway determines whether a traffic control solution corresponding to any APP in the APP list sent by the terminal is contained in a stored traffic control table. If no traffic control solution corresponding to any APP in the APP list sent by the terminal is contained in the stored traffic control table, the gateway sends a message for requesting acquiring the traffic control solution corresponding to the APP to a cloud server. The format of the request message is as shown in FIG. 5. Upon the reception of the request message, the cloud server sends the traffic control solution corresponding to the APP to the gateway. Upon the reception of the traffic control solution corresponding to the APP, the gateway stores the traffic control solution into the stored traffic control table.

At Step 505, the terminal sends a networking data message of the application to the gateway.

At Step 506, the gateway parses the message to obtain a networking parameter of the application.

In one embodiment, the networking parameter includes a target IP address and a target port, or a domain name, or URL information corresponding to the application.

At Step 507, the gateway searches the stored traffic control table based on the obtained networking parameter, and determines whether to control traffic of the application.

In one embodiment, the gateway searches the stored traffic control table based on the target IP address and the target port obtained by parsing corresponding to the application, and determines whether to control the traffic of the application. Alternatively, the gateway searches the stored traffic control table according to the domain name, and determines whether to control the traffic of the application. Alternatively, the gateway searches the stored traffic control table according to the URL information, and determines whether to control the traffic of the application.

The stored traffic control table may be preconfigured in the gateway, and may also be obtained by the gateway from the cloud server.

In responsive to that whether to control the traffic of the application is determined based on the target port and the target IP address, the traffic control table includes information such as a target IP address, a target port, a service name of the application and a version number of the application corresponding to a case that the application of the terminal transmits data. In responsive to that it is determined by searching the traffic control table to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In responsive to that whether to control the traffic of the application is determined based on the domain name or based on the URL information, a keyword corresponding to the domain name or the URL information is stored in the traffic control table. The domain name or the URL information is matched with a keyword stored in the traffic control table. If the matched keyword can be found, the networking data message corresponding to the application is prohibited from being transmitted, i.e., the traffic of the application is controlled. If no matched keyword can be found, the networking data message corresponding to the application is allowed to be transmitted, i.e., the traffic of the application is not controlled.

In the above method embodiment of the disclosure, when an APP is installed on the terminal, a name of the installed APP is sent to the gateway. The gateway determines whether a traffic control solution corresponding to the installed APP is contained in a stored traffic control table. If no traffic control solution corresponding to the installed APP is contained in the stored traffic control table, the gateway requests the traffic control solution corresponding to the installed APP from the cloud server.

It is to be noted that the function executed by the terminal in this embodiment may be implemented by a client installed on the terminal.

Figure 10:
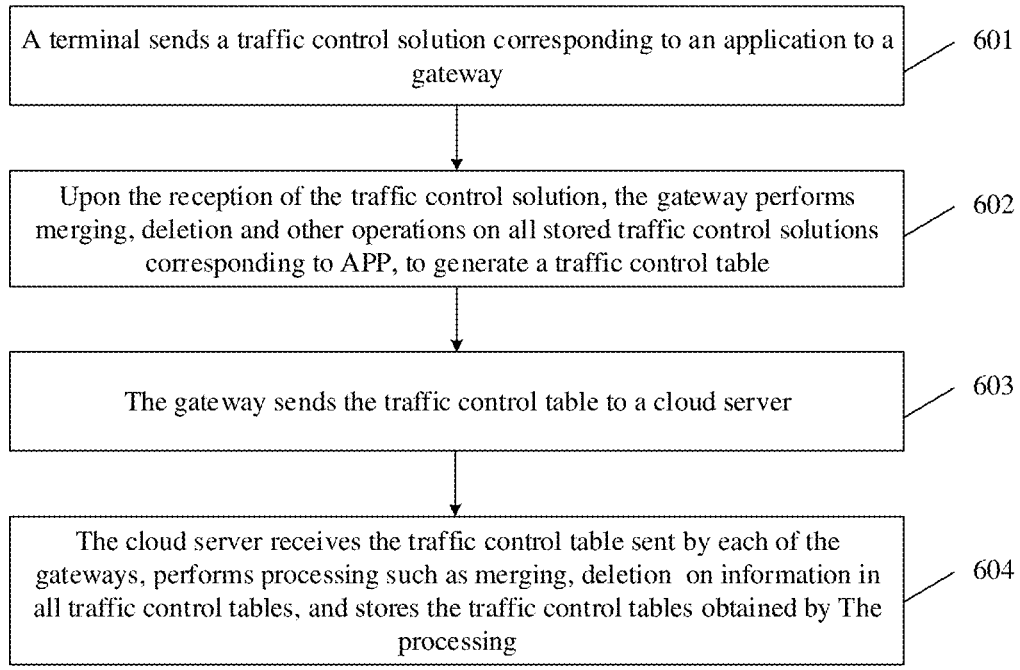
FIG. 10 is a schematic diagram showing a detailed processing flow of acquiring a traffic control table by a cloud server according to an embodiment of the disclosure.

In the above method embodiment of the disclosure, a detailed processing flow of acquiring the traffic control table corresponding to the APP by the cloud server is as shown in FIG. 10, and includes the following steps.

At Step 601, a terminal sends a traffic control solution corresponding to an application to a gateway.

In one embodiment, the terminal monitors networking requests of all APPs, and records a traffic control solution corresponding to each of the APPs. The traffic control solution includes a target IP address, a target port, a service name of an APP and a version number of the APP and other information corresponding to a case that the APP transmits data. The terminal periodically sends the traffic control solution to the gateway.

At Step 602, upon the reception of the traffic control solution, the gateway performs merging, deletion and other operations on all stored traffic control solutions corresponding to the APPs, to generate a traffic control table.

At Step 603, the gateway sends the traffic control table to a cloud server.

At Step 604, the cloud server receives the traffic control table sent by each of the gateways, performs processing such as merging and deletion on information in all traffic control tables, and stores traffic control tables obtained by the processing.

Sixth Method Embodiment

Figure 11:
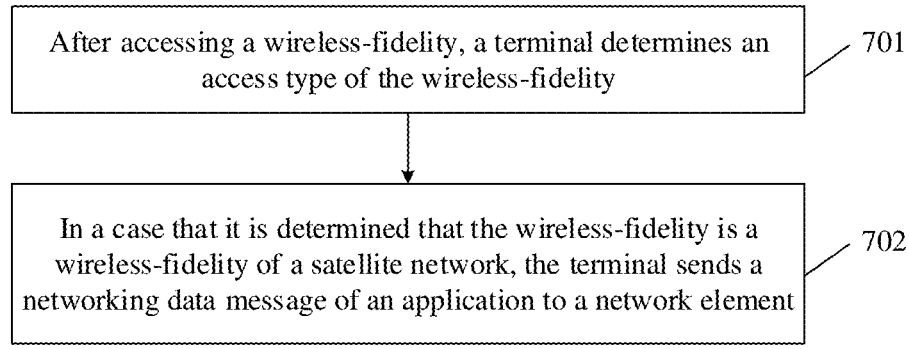
FIG. 11 is a schematic diagram showing a basic processing flow of a method for controlling traffic according to a sixth embodiment of the disclosure.

A method for controlling traffic is provided according to a sixth embodiment of the disclosure. A basic processing flow of the method is as shown in FIG. 11 and includes the following steps.

At Step 701, after accessing a wireless-fidelity, a terminal determines an access type of the wireless-fidelity.

In one embodiment, after accessing a wireless-fidelity, the terminal sends a network access request message carrying an access parameter of the terminal to a gateway. The network access request message is used for determining the type of the wireless-fidelity. The terminal receives a response message sent by a network element, and parses the response message. In responsive to successful parsing the response message, the terminal determines that the wireless-fidelity is a wireless-fidelity of a satellite network.

Herein, the format of the request message is as shown in FIG. 5. The TYPE in the message is represented as 01, which is used for indicating that the message is a message for requesting accessing the WIFI of the satellite network; and the DATA in the message indicates a type and a version number of a current operating system of the terminal. The format of the response message is as shown in FIG. 5. The TYPE is represented as 02, which is used for indicating that the message is a message for allowing the terminal to access the WIFI of the satellite network; and the DATA in the message is void.

The access parameter includes a type of a current operation system of the terminal and a version number of the operation system.

At Step 702, in responsive to that it is determined that the wireless-fidelity is a wireless-fidelity of a satellite network, the terminal sends a networking data message of an application to a network element.

In one embodiment, in responsive to that it is determined that the wireless-fidelity is the wireless-fidelity of the satellite network, the terminal sends the networking data message of the application to the network element. The networking data message includes a networking parameter which is used by the network element to determine whether to control traffic of the application.

In a specific implementation, the terminal reads an application list thereof, and sends the read application list to a gateway via a message manner. The format of the message is as shown in FIG. 5, the TYPE is represented as 03 and the DATA indicates an APP name and a length of the APP name. The terminal sends a networking data message of an application to a network element to request to run the application.

Herein, the terminal may not send the application list thereof and the networking data message of the application to the network element simultaneously. That is, the terminal sends the application list to the network element first, and then sends the networking data message of the application to the network element.

In a specific implementation, when the application list of the terminal is updated, an updated application list is sent to the network element.

It is to be noted that the function executed by the terminal in this embodiment may be implemented by a client installed on the terminal.

First Device Embodiment

Figure 12:
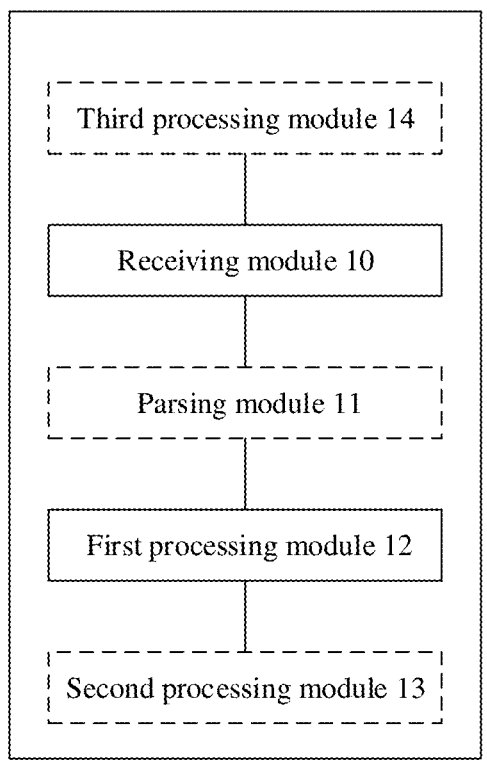
FIG. 12 is a schematic diagram showing a compositional structure of a device for controlling traffic according to a first device embodiment of the disclosure.

In order to implement the above method for controlling traffic, a device for controlling traffic applied to a satellite network is further provided according to an embodiment of the disclosure. The device is a network element at a network side. A compositional structure of the device is as shown in FIG. 12, and includes a receiving module 10 and a first processing module 12.

The receiving module 10 is configured to receive a networking data message of an application.

The first processing module 12 is configured to determine, based on the networking data message and a preset rule, whether to control traffic of the application.

In one embodiment, the device further includes a parsing module 11, configured to parse the message to obtain a networking parameter of the application.

In one embodiment, the device may further include a second processing module 13, configured to receive an application list, and search a stored traffic control table based on the application list; and request, in responsive to that it is determined that no application in the application list is contained in the traffic control table, acquiring a traffic control solution corresponding to the application, and store the acquired traffic control solution corresponding to the application to the traffic control table.

The device may further include a third processing module 14, configured to receive a network access request message and parse the network access request message to obtain an access parameter; and send a response message based on the access parameter.

In one embodiment, the parsing module 11 is configured to parse the networking data message of the application to obtain a target port and a target IP address, or a domain name, or URL information of the application.

In one embodiment, the first processing module 12 is configured to search the stored traffic control table based on the target port and the target IP address, and prohibit, in responsive to that it is determined to control traffic of an application corresponding to the target port and the target IP address, the networking data message of the application from being transmitted; and allow, in responsive to that it is determined not to control the traffic of the application corresponding to the target port and the target IP address, the networking data message of the application to be transmitted.

In one embodiment, the first processing module 12 is configured to search, based on the domain name or the URL information, the stored traffic control table, and prohibit, in responsive to that it is determined to control traffic of an application corresponding to the domain name or the URL information, the networking data message of the application from being transmitted; and allow, in responsive to that it is determined not to control the traffic of the application corresponding to the domain name or the URL information, the networking data message of the application to be transmitted.

In one embodiment, the networking parameter includes a target IP address and a target port, or a domain name, or URL information corresponding to the application.

In one embodiment, the stored traffic control table may be preconfigured in the gateway, and may also be obtained by the gateway from the cloud server. Therefore, there are two solutions that the gateway determines whether to control the traffic of the application. In a first solution, the gateway determines whether to control the traffic of the application according to a traffic control table stored in the gateway. The gateway performs matching in the traffic control table stored in the gateway by using a keyword of the application, does not control the traffic of the application if no traffic control solution corresponding to the application is contained in the traffic control table stored in the gateway, and controls, if a traffic control solution corresponding to the application is contained in the traffic control table stored in the gateway, the traffic according to the traffic control solution. In a second solution, the gateway first queries whether a traffic control solution corresponding to the application is contained in a traffic control table stored in the gateway, acquires, if no traffic control solution corresponding to the application is contained in the traffic control table stored in the gateway, a traffic control solution corresponding to the application from the cloud server, stores the acquired traffic control solution in the traffic control table, and controls the traffic of the application according to the stored traffic control table.

In responsive to that whether to control the traffic of the application is determined based on the target IP address and the target port, the traffic control table includes information such as a target IP address, a target port, a service name of the application and a version number of the application corresponding to a case that the application of the terminal transmits data. In responsive to that it is determined by searching the traffic control table to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In one embodiment, in responsive to that whether to control the traffic of the application is determined based on the domain name or based on the URL information, a keyword corresponding to the domain name or the URL information is stored in the traffic control table. The domain name or the URL information is matched with a keyword stored in the traffic control table. If the matched keyword can be found, the networking data message corresponding to the application is prohibited from being transmitted, i.e., the traffic of the application is controlled. If no matched keyword can be found, the networking data message corresponding to the application is allowed to be transmitted, i.e., the traffic of the application is not controlled.

Second Device Embodiment

Figure 13:
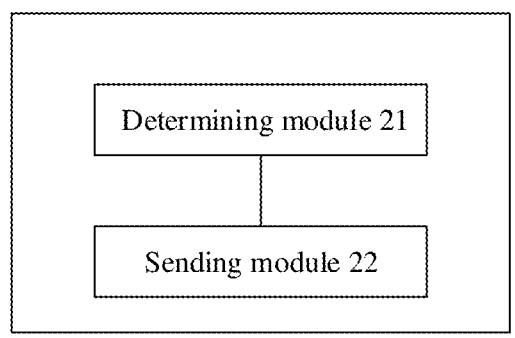
FIG. 13 is a schematic diagram showing a compositional structure of a terminal according to a second device embodiment of the disclosure.

In order to implement the above method for controlling traffic, a terminal is further provided according to an embodiment of the disclosure. A compositional structure of the terminal is as shown in FIG. 13, and includes a determining module 21 and a sending module 22.

The determination module 21 is configured to determine, after the terminal accesses a wireless-fidelity, an access type of the wireless-fidelity.

The sending module 22 is configured to send, in responsive to that it is determined that the wireless-fidelity is a wireless-fidelity of a satellite network, a networking data message of an application to a network element.

The networking data message of the application includes a networking parameter, and the networking parameter is used by the network element to determine whether to control traffic of the application.

In one embodiment, the sending module 22 is further configured to send an application list thereof to the network element to request running the application.

In one embodiment, the determining module 21 is configured to send a network access request message carrying an access parameter of the terminal to a network element. The network access request message is used for determining the type of the wireless-fidelity; receive a response message sent by the network element, and parse the response message; and determine, in responsive to successfully parsing the response message, that the wireless-fidelity is a wireless-fidelity of a satellite network.

The access parameter includes a type of an operating system and a version number of the operating system.

Herein, the format of the request message is as shown in FIG. 5. The TYPE in the message is represented as 01, which is used for indicating that the message is a message for requesting accessing the WIFI of the satellite network; and the DATA in the message indicates a type and a version number of a current operating system of the terminal. The format of the response message is as shown in FIG. 5. The TYPE is represented as 02, which is used for indicating that the message is a message for allowing the terminal to access the WIFI of the satellite network; and the DATA in the message is void.

In one embodiment, the sending module 22 reads, in responsive to that the determining module 21 determines that the wireless-fidelity is the wireless-fidelity of the satellite network, an application list thereof, and sends the read application list to the gateway as a message. The format of the message is as shown in FIG. 5, the Type is represented as 03 and the DATA indicates an APP name and a length of the APP name.

Third Device Embodiment

Figure 14:
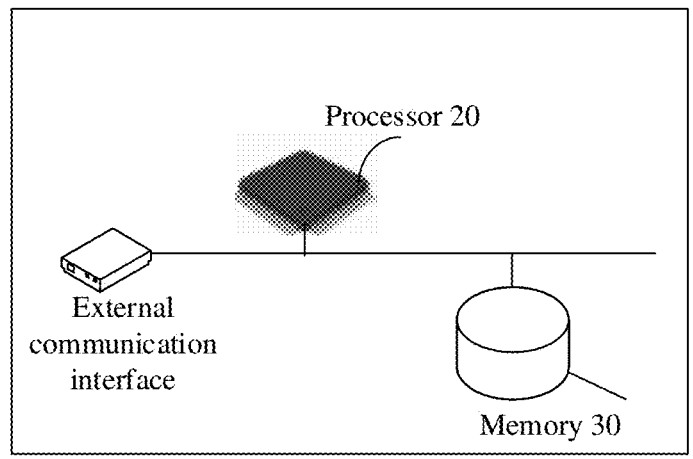
FIG. 14 is a schematic diagram showing a hardware compositional structure of a device for controlling traffic according to a third embodiment of the disclosure.

In order to implement the above method for controlling traffic, a terminal is further provided according to an embodiment of the disclosure. A hardware compositional structure of the terminal is as shown in FIG. 14, and includes a processor 20 and a memory 30 storing a processor executable instruction. The processor 20, when executing the instruction, performs the following actions.

After accessing a wireless-fidelity, an access type of the wireless-fidelity is determined.

In responsive to that it is determined that the wireless-fidelity is a wireless-fidelity of a satellite network, a networking data message of an application is sent to a network element.

The networking data message of the application includes a networking parameter, and the networking parameter is used by the network element to determine whether to control traffic of the application.

In one embodiment, the processor 22 is further configured to send an application list thereof to the network element.

In one embodiment, the processor 20 is configured to send a network access request message carrying an access parameter of the terminal to the network element, where the network access request message is used for determining the type of the wireless-fidelity;

receive a response message sent by a gateway; and parse the response message, and determine, in responsive to successfully parsing the response message, that the wireless-fidelity is the wireless-fidelity of the satellite network.

In one embodiment, the access parameter includes a type of an operating system and a version number of the operating system.

In one embodiment, the processor 20 is further configured to send, when the application list of the terminal is updated, an updated application list to the network element.

It is to be noted that, in an actual application, the function of each of the receiving module 10, the parsing module 11, the first processing module 12, the second processing module 13 and the third processing module 14 may be implemented by a central processing unit (CPU), or a microprocessor unit (MPU), or a digital signal processor (DSP), or a field programmable gate array (FPGA) located on a gateway, and the function of each of the determining module 21 and the sending module 22 may be implemented by a CPU, or an MPU, or a DSP or an FPGA located on the terminal.

It is to be noted that the device for controlling traffic or the terminal provided by the above embodiment are exemplified by the above division of the program modules in controlling the traffic. In actual applications, the above processing may be allocated to be implemented by different program modules as required, that is, an internal structure of the device or the terminal is divided into different program modules to implement all or a part of processing described above. In addition, the method for controlling traffic and the device for controlling traffic according to the above embodiments pertain to a same concept, and reference can be made onto the method embodiments for a specific implementation process of the device, which is no longer repeated here.

System Embodiment

Figure 15:
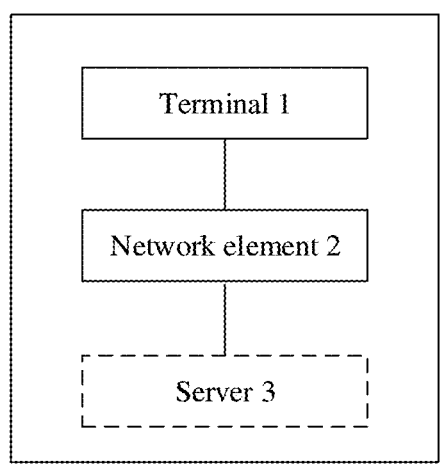
FIG. 15 is a schematic diagram showing a compositional structure of a system for controlling traffic according to an embodiment of the disclosure.

A system for controlling traffic is provided according to an embodiment of the disclosure. A compositional structure of the system is as shown in FIG. 15 and includes a terminal 1 and a network element 2.

The terminal 1 is configured to determine, after accessing a wireless-fidelity, an access type of the wireless-fidelity, and send, in responsive to that it is determined that the wireless-fidelity is a wireless-fidelity of a satellite network, a networking data message of an application to the network element.

The networking data message of the application includes a networking parameter, and the networking parameter is used by the network element to determine whether to control traffic of the application.

The network element 2 is configured to receive the networking data message of the application sent by the terminal, and determine, based on the networking data message and a preset rule, whether to control traffic of the application.

In one embodiment, the processor 22 is further configured to send an application list thereof to the network element.

In one embodiment, the function executed by the network element 2 may be implemented by a gateway. The network element 2 is further configured to parse the networking data message to obtain the networking parameter of the application. The networking parameter includes a target IP address and a target port, or a domain name, or URL information corresponding to the application.

The network element 2 is further configured to send a traffic control table to a cloud server. Correspondingly, the system may further include a cloud server 3, which is configured to receive the traffic control table sent by the network element, and process the traffic control table. The processing includes merging, deletion, storage and the like.

In one implementation, a process of acquiring the traffic control table sent by the gateway by the cloud server is described below. The terminal sends a stored traffic control solution to the gateway at a fixed period or a preset time, and the gateway performs summarizing, merging, deletion or other processing on the received traffic control solution to obtain the traffic control table.

In one implementation, the terminal 1 sends a network access request message carrying an access parameter of the terminal, where the network access request message is used for determining the type of the wireless-fidelity; receives a response message sent by the network element; and parses the response message, and determines, in responsive to successfully parsing the response message, that the wireless-fidelity is a wireless-fidelity of a satellite network.

In one implementation, the terminal 1 is further configured to send, in responsive to that the application list thereof is updated, an updated application list to the network element.

In one implementation, the network element 2 is further configured to receive a network access request message sent by the terminal and parse the network access request message to obtain an access parameter; and send a response message based on the access parameter.

In one implementation, the stored traffic control table may be preconfigured in the network element, and may also be obtained by the network element from the cloud server. Therefore, there are two solutions that the network element determines whether to control the traffic of the application. In a first solution, the network element determines whether to control the traffic of the application according to a traffic control table stored in the network element. The network element performs matching in the traffic control table stored in the network element by using a keyword of the application, does not control the traffic of the application if no traffic control solution corresponding to the application is contained in the traffic control table stored in the network element, and controls, if a traffic control solution corresponding to the application is contained in the traffic control table stored in the network element, the traffic according to the traffic control solution. In a second solution, the network element first queries whether a traffic control solution corresponding to the application is contained in a traffic control table stored in the network element, acquires, if no traffic control solution corresponding to the application is contained in the traffic control table stored in the network element, a traffic control solution corresponding to the application from the cloud server, stores the acquired traffic control solution in the traffic control table, and controls the traffic of the application according to the stored traffic control table.

In one implementation, the network element 2 is configured to search the stored traffic control table based on the target port and the target IP address. In responsive to that it is determined to control the traffic of the application corresponding to the target port and the target IP address, the networking data message of the application is prohibited from being transmitted. In responsive to that it is determined not to control the traffic of the application corresponding to the target port and the target IP address, the networking data message of the application is allowed to be transmitted.

In one implementation, the network element 2 is configured to search the stored traffic control table based on the domain name or the URL information. In responsive to that it is determined to control the traffic of the application corresponding to the domain name or the URL information, the networking data message of the application is prohibited from being transmitted. In responsive to that it is determined not to control the traffic of the application corresponding to the domain name or the URL information, the networking data message of the application is allowed to be transmitted.

In the embodiment of the disclosure, the function executed by the network element 2 may be implemented by the gateway.

A device for controlling traffic is further provided according to an embodiment of the disclosure, which includes a processor and a memory storing a processor executable instruction. The processor, when executing the instruction, performs the following actions.

A networking data message of an application is received.

Whether to control traffic of the application is determined based on the networking data message and a preset rule.

In one embodiment, the processor is further configured to execute, when running the computer program, the following operations.

The networking data message is parsed to obtain a networking parameter of the application.

In one embodiment, the processor is further configured to execute, when running the computer program, the following operations.

Matching is performed in a stored traffic control table based on a keyword in the networking parameter.

In responsive to that it is determined that no traffic control solution corresponding to the application is contained in the stored traffic control table, the traffic of the application is not controlled.

In responsive to that it is determined that a traffic control solution corresponding to the application is contained in the stored traffic control table, the traffic of the application is controlled according to the traffic control solution corresponding to the application.

In one embodiment, the processor is further configured to execute, when running the computer program, the following operations.

Matching is performed in a stored traffic control table based on a keyword in the networking parameter.

In responsive to that it is determined that no traffic control solution corresponding to the application is contained in the stored traffic control table, the traffic control solution corresponding to the application is acquired from a cloud server, and the acquired traffic control solution is stored into the stored traffic control table.

The traffic of the application is controlled according to the stored traffic control table.

In one embodiment, the processor is further configured to execute, when running the computer program, the following operations.

An application list sent by the terminal is received, and the stored traffic control table is searched based on the application list.

In responsive to that it is determined that no application in the application list is contained in the traffic control table, the traffic control solution corresponding to the application is acquired from a cloud server, and the traffic control solution is stored into the traffic control table.

In one embodiment, the processor is further configured to execute, when running the computer program, the following operations.

The networking data message of the application is parsed to obtain a target port and a target IP address, or a domain name, or URL information of the application.

In one embodiment, the processor is further configured to execute, when running the computer program, the following operations.

A stored traffic control table is searched based on the target port and the target IP address, and in responsive to that it is determined to control traffic of an application corresponding to the target port and the target IP address, a networking data message of the application is prohibited from being transmitted.

In responsive to that it is determined not to control the traffic of the application corresponding to the target port and the target IP address, the networking data message of the application is allowed to be transmitted.

In one embodiment, the processor is further configured to execute, when running the computer program, the following operations.

A stored traffic control table is searched based on the domain name or the URL information, and in responsive to that it is determined to control traffic of an application corresponding to the domain name or the URL information, a networking data message of the application is prohibited from being transmitted.

In responsive to that it is determined not to control the traffic of the application corresponding to the domain name or the URL information, the networking data message of the application is allowed to be transmitted.

Correspondingly, a storage medium is further provided according to an embodiment of the disclosure, which stores a computer executable instruction. The computer executable instruction is used for performing the following operations.

A networking data message, sent by a terminal, of an application is received.

Whether to control traffic of the application is determined based on the networking data message and a preset rule.

In one embodiment, when the computer program is executed by the processor, the following operation is performed.

The networking data message is parsed to obtain a networking parameter of the application.

In one embodiment, when the computer program is executed by the processor, the following operations are performed.

Matching is performed in a stored traffic control table by using a keyword in the networking parameter.

In responsive to that it is determined that no traffic control solution corresponding to the application is contained in the stored traffic control table, the traffic of the application is not controlled.

In responsive to that it is determined that a traffic control solution corresponding to the application is contained in the stored traffic control table, the traffic of the application is controlled according to the traffic control solution corresponding to the application.

In one embodiment, when the computer program is executed by the processor, the following operations are performed.

Matching is performed in a stored traffic control table by using a keyword in the networking parameter In responsive to that it is determined that no traffic control solution corresponding to the application is contained in the stored traffic control table, the traffic control solution corresponding to the application is acquired from a cloud server, and the acquired traffic control solution is stored into the stored traffic control table.

The traffic of the application is controlled according to the stored traffic control table.

In one embodiment, the processor, when executing the computer program, performs the following operations.

An application list sent by the terminal is received.

The stored traffic control table is searched based on the application list.

In responsive to that it is determined that no application in the application list is contained in the traffic control table, the traffic control solution corresponding to the application is acquired from a cloud server, and the traffic control solution is stored into the traffic control table.

In one embodiment, the processor, when executing the computer program, performs the following operation.

The networking data message of the application is parsed to obtain a target port and a target IP address, or a domain name, or URL information of the application In one embodiment, the processor, when executing the computer program, performs the following operation.

A stored traffic control table is searched based on the target port and the target IP address.

In responsive to that it is determined to control traffic of an application corresponding to the target port and the target IP address, a networking data message of the application is prohibited from being transmitted.

In responsive to that it is determined not to control the traffic of the application corresponding to the target port and the target IP address, the networking data message of the application is allowed to be transmitted.

In one embodiment, the processor, when executing the computer program, performs the following operation.

A stored traffic control table is searched based on the domain name or the URL information;

In responsive to that it is determined to control traffic of an application corresponding to the domain name or the URL information, a networking data message of the application is prohibited from being transmitted In responsive to that it is determined not to control the traffic of the application corresponding to the domain name or the URL information, the networking data message of the application is allowed to be transmitted.

A device for controlling traffic is further provided according to an embodiment of the disclosure, which includes a processor and a memory storing a processor executable instruction. The processor, when executing the processor executable instruction, performs the following actions.

After a wireless-fidelity is accessed, an access type of the wireless-fidelity is determined.

When it is determined that the wireless-fidelity is a wireless-fidelity of a satellite network, a networking data message of an application is sent to a network element. The networking data message of the application is used by the network element to determine whether to control traffic of the application.

In one embodiment, the networking data message of the application includes a networking parameter, and the networking parameter is used by the network element to determine whether to control traffic of the application.

In one embodiment, the processor, when executing the computer program, performs the following operation.

An application list is sent to a network element.

In one embodiment, the processor, when executing the computer program, performs the following operation.

A network access request message carrying an access parameter of the terminal is sent to the network element. The network access request message is used for determining an access type of the wireless-fidelity.

A response message sent by the network element is received.

The response message is parsed, and it is determined in responsive to successfully parsing the response message that the wireless-fidelity is the wireless-fidelity of the satellite network.

In one embodiment, the access parameter includes a type of an operating system and a version number of the operating system.

In one embodiment, the processor, when executing the computer program, performs the following operation.

When the application list of the terminal is updated, an updated application list is sent to the network element.

Those skilled in the art should understand that the embodiments of the disclosure can implemented as a method, a system or a computer program product. Therefore, the disclosure may be implemented in a form of a hardware embodiment, a software embodiment or a combination thereof. Moreover, the disclosure may be implemented in a form of the computer program product implemented on one or more computer available storage medium (including, but not limited to, a disk memory, an optical memory and the like) containing computer available program codes.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be implemented by computer program instructions. These computer program instructions can be provided to a general computer, a dedicated computer, an embedded processor or a processor of other programmable data processing device to form a machine, so that a device for realizing functions assigned in one or more flows of the flowcharts and/or one or more blocks of the block diagrams is formed via instructions executed by the computer or the processor of the other programmable data processing device.

These computer program instructions can also be stored in a computer readable memory capable of guiding the computer or the other programmable data processing device to operate in a specific mode, so that a manufactured product including an instruction device is formed by the instruction stored in the computer readable memory, and the instruction device can realize the functions assigned in one or more flows of the flowcharts and/or one or more blocks of the block diagrams.

These computer program instructions can also be loaded into the computer or the other programmable data processing device, so that processing realized by the computer is generated by executing a series of operation steps on the computer or the other programmable device, and therefore the instructions executed on the computer or the other programmable device provide steps of realizing the functions assigned in one or more flows of the flowcharts and/or one or more blocks of the block diagrams.

The foregoing is merely preferred embodiments of the disclosure, rather than limiting the protection scope of the disclosure.

INDUSTRIAL APPLICABILITY

In the embodiments of the disclosure, after accessing the wireless-fidelity, the terminal determines an access type of the wireless-fidelity. In responsive to that it is determined that the wireless-fidelity is a wireless-fidelity of the satellite network, the terminal sends a networking data message of the application to the network element. The network element determines whether to control traffic of the application based on the networking data message and a preset rule. In this way, the network element can determine whether to control the traffic of the application based on the networking data message of the application and the preset rule, thereby implementing the control on WIFI traffic of the user in the satellite network and saving operation cost of the satellite network.

The invention claimed is:

1. A method for controlling traffic applied to a satellite network, the method comprising:
    receiving, by a network element, a networking data message of an application sent by a terminal;
    determining, based on the networking data message and a preset rule, whether to control traffic of the application;
    receiving, by the network element, an application list sent by the terminal;
    searching a stored traffic control table based on the application list; and
    acquiring a traffic control solution corresponding to the application from a cloud server and storing the traffic control solution in the stored traffic control table in response to determining that any application in the application list is not contained in the stored traffic control table.

2. The method for controlling traffic of claim 1, wherein after the receiving, by the network element, the networking data message of the application sent by the terminal, the method further comprises:
    parsing the networking data message to obtain a networking parameter of the application.

3. The method for controlling traffic of claim 2, wherein the determining, based on the networking data message and the preset rule, whether to control the traffic of the application comprises:
    performing, by the network element, matching in the stored traffic control table by using a keyword in the networking parameter;
    not controlling the traffic of the application in response to determining that no traffic control solution corresponding to the application is contained in the stored traffic control table; and
    controlling the traffic of the application according to the traffic control solution corresponding to the application in response to determining that the traffic control solution corresponding to the application is contained in the stored traffic control table.

4. The method for controlling traffic of claim 2, wherein the determining, based on the networking data message and the preset rule, whether to control the traffic of the application comprises:
    performing, by the network element, matching in the stored traffic control table by using a keyword in the networking parameter; and
    controlling the traffic of the application according to the stored traffic control table.

5. The method for controlling traffic of claim 2, wherein the parsing the networking data message to obtain the networking parameter of the application comprises:
    parsing the networking data message of the application to obtain a target port and a target internet protocol (IP) address, or a domain name, or uniform resource locator (URL) information of the application.

6. The method for controlling traffic of claim 5, wherein the determining, based on the networking data message and the preset rule, whether to control the traffic of the application comprises:

searching, based on the target port and the target IP address, the stored traffic control table;

prohibiting the networking data message of the application from being transmitted in response to determining to control traffic of the application corresponding to the target port and the target IP address; and allowing the networking data message of the application to be transmitted in response to determining not to control the traffic of the application corresponding to the target port and the target IP address.

7. The method for controlling traffic of claim 5, wherein the determining, based on the networking data message and the preset rule, whether to control the traffic of the application comprises:

searching, based on the domain name or the URL information, the stored traffic control table;

prohibiting the networking data message of the application from being transmitted in response to determining to control traffic of the application corresponding to the domain name or the URL information; and allowing the networking data message of the application to be transmitted in response to determining not to control the traffic of the application corresponding to the domain name or the URL information.

8. A method for controlling traffic, comprising:

after accessing a wireless-fidelity, determining, by a terminal, an access type of the wireless-fidelity; and sending a networking data message of an application to a network element in response to determining that the wireless-fidelity is a wireless-fidelity of a satellite network, wherein the networking data message of the application is used by the network element to determine whether to control traffic of the application;

wherein the determining, by the terminal, the access type of the wireless-fidelity comprises:

sending a network access request message carrying an access parameter of the terminal to the network element, wherein the network access request message is used for determining the access type of the wireless-fidelity;

receiving a response message sent by the network element; and parsing the response message, and determining in response to successfully parsing the response message that the wireless-fidelity is the wireless-fidelity of the satellite network.

9. The method of claim 8, wherein the networking data message of the application comprises a networking parameter, and the networking parameter is used by the network element to determine whether to control the traffic of the application.

10. The method of claim 9, further comprising:

sending, by the terminal, an application list to the network element.

11. The method of claim 8, wherein the access parameter comprises:

a type of an operating system and a version number of the operating system.

12. The method of claim 10, further comprising:

in response to the application list of the terminal being updated, sending an updated application list to the network element.

13. A terminal, comprising a processor and a memory storing a processor executable instruction, wherein the processor, when executing the processor executable instruction, performs the following actions:

after accessing a wireless-fidelity, determining, by the terminal, an access type of the wireless-fidelity;

sending a network access request message carrying an access parameter of the terminal to a network element, wherein the network access request message is used for determining the access type of the wireless-fidelity;

receiving a response message sent by the network element;

parsing the response message, and determining in response to successfully parsing the response message that the wireless-fidelity is a wireless-fidelity of a satellite network; and sending a networking data message of an application to the network element in response to determining that the wireless-fidelity is the wireless-fidelity of the satellite network, wherein the networking data message of the application is used by the network element to determine whether to control traffic of the application.

14. The terminal of claim 13, wherein the networking data message of the application comprises a networking parameter, and the networking parameter is used by the network element to determine whether to control the traffic of the application.

15. The terminal of claim 14, wherein the processor, when executing the processor executable instruction, further performs the following action:

sending an application list to the network element.

16. A device for controlling traffic, comprising a processor and a memory storing a processor executable instruction, wherein the processor, when executing the instruction, performs the following actions:

receiving a networking data message of an application sent by a terminal;

determining, based on the networking data message and a preset rule, whether to control traffic of the application;

receiving an application list sent by the terminal;

searching a stored traffic control table based on the application list; and acquiring a traffic control solution corresponding to the application from a cloud server and storing the traffic control solution in the stored traffic control table in response to determining that any application in the application list is not contained in the stored traffic control table.

17. The device for controlling traffic of claim 16, wherein the processor, when executing the processor executable instruction, further performs the following action:

parsing the networking data message to obtain a networking parameter of the application.

* * * * *